United States Patent
Headley et al.

(10) Patent No.: US 7,229,178 B1
(45) Date of Patent: Jun. 12, 2007

(54) VARIABLE FOCAL LENGTH DEFORMABLE MIRROR

(75) Inventors: Daniel Headley, Albuquerque, NM (US); Marc Ramsey, Albuquerque, NM (US); Jens Schwarz, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 240 days.

(21) Appl. No.: 11/017,337

(22) Filed: Dec. 20, 2004

(51) Int. Cl.
*G02B 5/08* (2006.01)
*G02B 7/182* (2006.01)
(52) U.S. Cl. ..................................... 359/847; 359/849
(58) Field of Classification Search ......... 359/846–847
See application file for complete search history.

(56) References Cited

U.S. PATENT DOCUMENTS

| | | | |
|---|---|---|---|
| 3,972,600 A | 8/1976 | Cobarg | |
| 4,043,644 A | 8/1977 | Humphrey | |
| 4,162,825 A * | 7/1979 | Dowty | 359/847 |
| 4,822,155 A * | 4/1989 | Waddell | 359/847 |
| 6,467,915 B2 | 10/2002 | Bar et al. | |
| 6,820,986 B2 * | 11/2004 | Dragovan | 359/847 |

OTHER PUBLICATIONS

Warren C. Young, et al, Roark's Formulas for Stress and Strain, McGraw-Hill, Seventh Edition, 2002, Chapter 11.

* cited by examiner

*Primary Examiner*—Stephone B. Allen
*Assistant Examiner*—Aline D. McNaull
(74) *Attorney, Agent, or Firm*—Kevin W. Bieg

(57) ABSTRACT

A variable focal length deformable mirror has an inner ring and an outer ring that simply support and push axially on opposite sides of a mirror plate. The resulting variable clamping force deforms the mirror plate to provide a parabolic mirror shape. The rings are parallel planar sections of a single paraboloid and can provide an on-axis focus, if the rings are circular, or an off-axis focus, if the rings are elliptical. The focal length of the deformable mirror can be varied by changing the variable clamping force. The deformable mirror can generally be used in any application requiring the focusing or defocusing of light, including with both coherent and incoherent light sources.

20 Claims, 12 Drawing Sheets

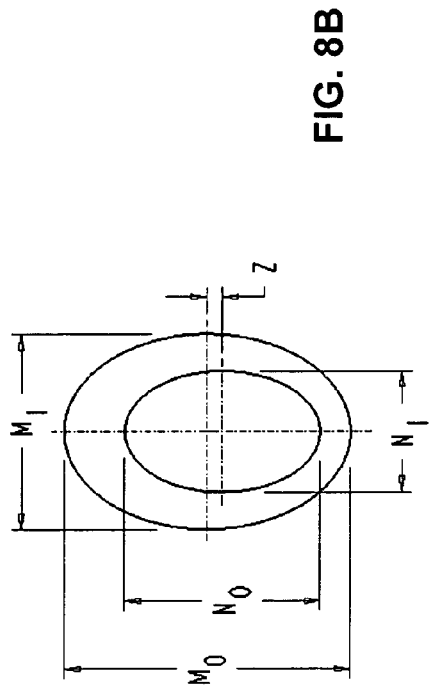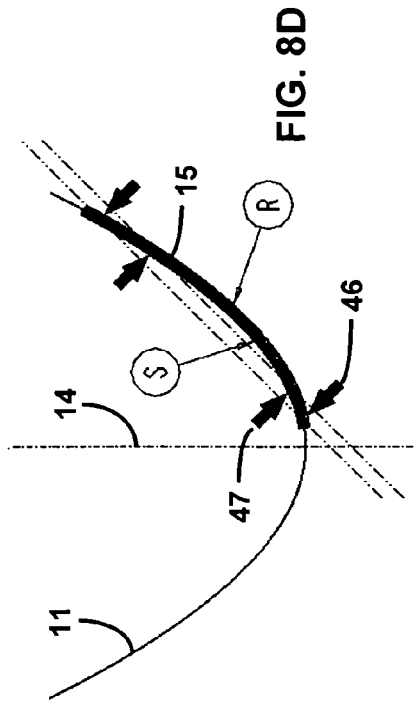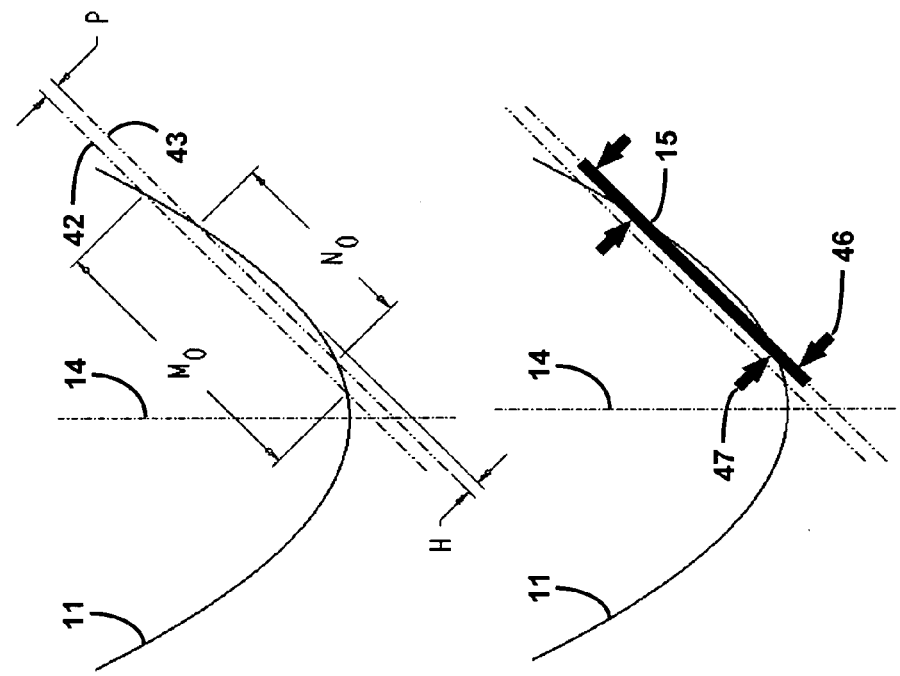
FIG. 8A
FIG. 8B
FIG. 8C
FIG. 8D

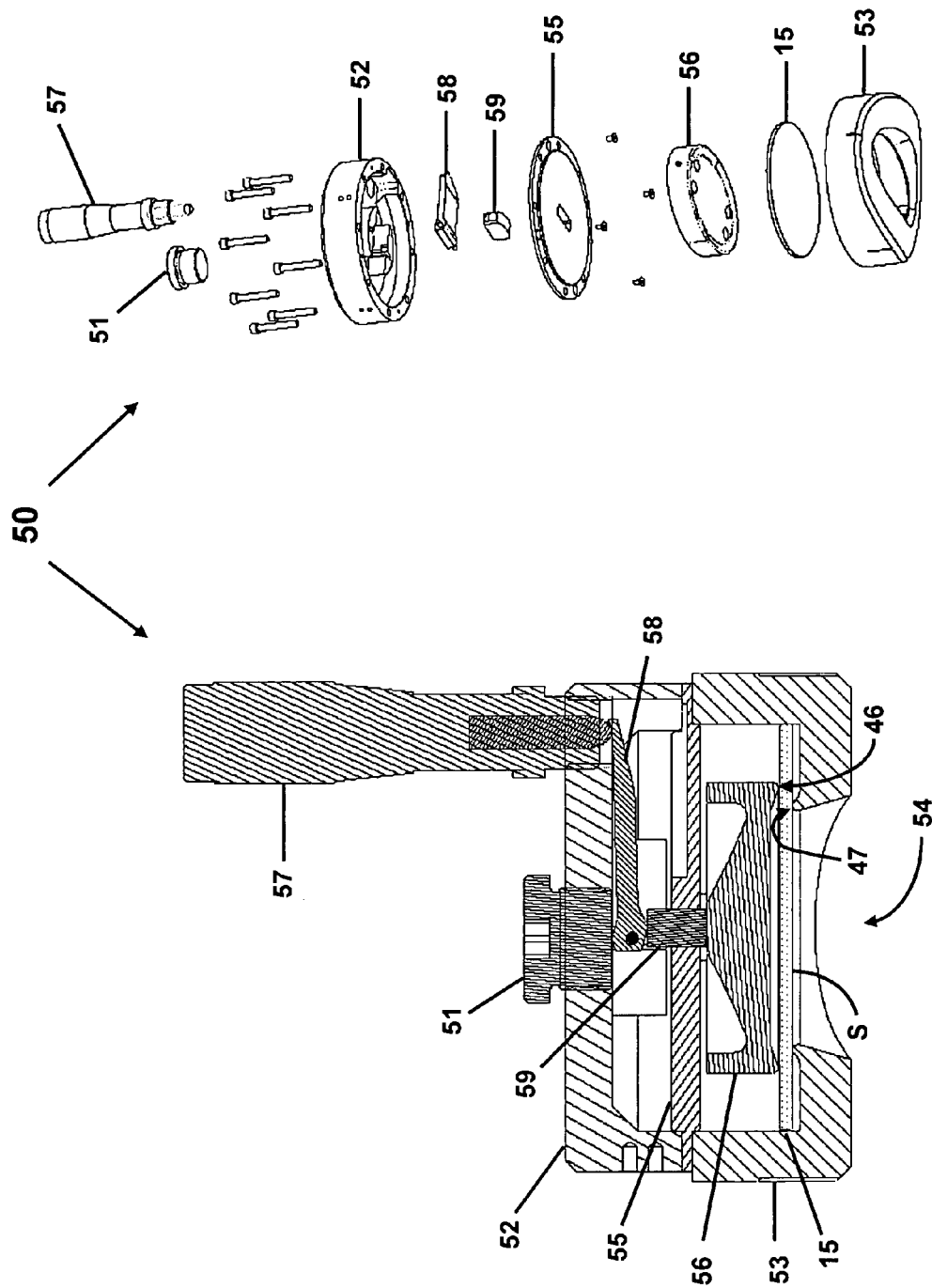

VARIABLE FOCAL LENGTH DEFORMABLE MIRROR

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to deformable mirrors and, in particular, to a variable focal length concave or convex deformable mirror for on- or off-axis focusing.

BACKGROUND OF THE INVENTION

Reflective optics are finding increasing use in optical systems due to the transmission losses, chromatic aberrations, lower damage thresholds, and higher B-integral accompanying the use of refractive optics. For example, ultrafast lasers and their applications rely heavily on broadband mirrors, because group velocity dispersion in refractive optics leads to pulse broadening, spectral distortions, and possibly beam breakup. The simplest reflecting objective is the spherical mirror. However, the spherical mirror has undercorrected spherical aberration for distant objects. In addition, coma and astigmatism are present in a spherical mirror when the aperture stop is not at the center of curvature. Parabolic mirrors have several advantages over spherical mirrors for aberration control. As with all conic surfaces, a point object located at one focus can be imaged at the other focus without spherical aberration. In particular, with a parabolic mirror, a distant axial object can form a diffraction-limited image at focus. A disadvantage of most reflective optical systems is that there is generally a central obscuration that can affect the light throughput and image contrast (e.g., Cassegrain and Newtonian type telescopes in astronomy). Therefore, a parabolic mirror with an off-axis aperture may be desirable to keep the focus out of the entering beam.

Commercial lenses and spherical mirrors are typically ground into a spherical shape, which only approximates a parabola at their very center. This leads to aberrations that are inherently present in all spherical optics. However, because of their uniaxial character, aspheric parabolic surfaces are generally much more difficult and costly to fabricate than ordinary spherical surfaces. Aspheric mirrors can be fabricated using computer-controlled diamond turning and traditional polishing methods, but material selection is limited and manufacturing costs can be large.

Fabricating off-axis aspheric surfaces is even more difficult. Currently, off-axis parabolic mirrors are cut from a parent paraboloid at the desired off-axis angle. While this method is feasible for small optics (e.g., 1-3 inch diameter) it becomes increasingly difficult to make large-angle, large-diameter off-axis parabolas. Therefore, almost all large off-axis focusing mirrors have off-axis angles of less than 5 degrees. The fabrication of larger off-axis angles is extremely expensive, because they require very big parent parabolas.

Furthermore, an as-machined mirror is not deformable and, therefore, does not enable variability of the focal length. Such deformable mirrors are highly desirable in imaging, laser projection, and astronomical applications. For these applications, deformable mirrors offer the possibility of improving the flexibility and capabilities of the imaging system while reducing size, weight and potentially cost.

Several prior inventions have used mechanical devices to elastically deform a thin mirror to provide a variable focal length deformable mirror. U.S. Pat. No. 3,972,600 to Cobarg discloses a deformable mirror that uses fluid pressure to elastically deform an edge-supported metal foil to provide a spherical mirror surface. The focal length of the mirror can be easily adjusted by varying the differential pressure across the foil. However, there are risks of fluid leakage and contamination of the mirror surface due to the pressurizing fluid, and the deformation provides a non-parabolic reflecting surface that is not optimum for many applications. U.S. Pat. No. 4,043,644 to Humphrey discloses a deformable mirror that uses a four-point load to elastically deform a substantially spherical mirror plate. The mirror is warped for off-axis use along an axis to provide a substantially toric shape that is not rotationally symmetric and can only approximate a parabolic mirror. U.S. Pat. No. 6,467,915 to Bar et al. discloses a deformable mirror that uses an annular pusher to deform a round mirror plate. However, because the outer edge of the mirror plate is rigidly mounted to a housing in an axial holder, and not simply supported, a non-parabolic surface results.

Therefore, a need remains for a variable focal length deformable mirror that has a parabolic mirror shape. Furthermore, a deformable mirror that enables an off-axis aperture is needed to keep the focus out of the entering beam.

SUMMARY OF THE INVENTION

An on-axis variable focal length deformable mirror comprises a mirror plate having a reflective surface and a symmetry axis perpendicular to the plane of the mirror plate; an inner circular ring, centered on the symmetry axis, that simply supports and pushes axially on a side of the mirror plate; an outer circular ring, concentric with the inner circular ring, that simply supports and pushes axially on the opposite side of the mirror plate; and means for pushing on the inner circular ring in an axially opposed direction relative to the outer circular ring, while maintaining the planarity and parallelism of the rings, to provide a variable clamping force to the mirror plate and thereby deforming the mirror plate to provide an on-axis parabolic mirror shape.

Alternatively, an off-axis variable focal length deformable mirror comprises a mirror plate having a reflective surface and a symmetry axis about two orthogonal planes perpendicular to the plane of the mirror plate; an inner elliptical ring that simply supports and pushes axially on a side of the mirror plate; an outer elliptical ring that simply supports and pushes axially on the opposite side of the mirror plate; wherein the inner elliptical ring and the outer elliptical ring are parallel planar sections of a single paraboloid and the symmetry axis of the mirror plate intersects and is perpendicular to the collinear major axis of the elliptical rings; and means for pushing on the inner elliptical ring in an axially opposed direction relative to the outer elliptical ring, while maintaining the planarity and parallelism of the rings, to provide a variable clamping force to the mirror plate and thereby deforming the mirror plate to provide an off-axis parabolic mirror shape.

Both the on-axis or off-axis deformable mirrors can have a concave or convex parabolic mirror shape. If the reflective surface is on the inner-ring-side of the mirror plate, a concave mirror is provided. If the reflective surface is on the outer-ring-side of the mirror plate, a convex mirror is provided. The mirror plate can be a deformable mechanical material, such as glass, metal, plastic, ceramic, or composite. In particular, the mirror plate can be a stock, round, coated or uncoated, flat optical blank that can be easily replaced if damaged. Internally cooled optics can also be used. The deformable mirror does not require expensive or elaborate non-planar grinding and polishing of an aspheric parabolic surface. The deformable mirror assembly does not require complicated apparatus, calibration, or control, and can be implemented at a low cost.

The mechanical geometry can be easily determined with a simple geometric algorithm requiring only inputs of focal length, off-axis angle, mirror plate diameter, and clear aperture. The deformable mirror can be easily designed with a nearly unlimited range of input parameters. A truly parabolic mirror shape can be obtained, enabling focusing without aberrations. Furthermore, because the deformable mirror can be built with small f-numbers, it can provide tight beam focusing.

The deformable mirror can generally be used in any application requiring the focusing or defocusing of light, including with both coherent and incoherent light sources. The deformable mirror is particularly attractive for thermal lens compensation in laser amplifier cavities, adaptive optics, off-axis spatial filters, telescopes, or any other application where high power laser beams need to be focused, especially in optical systems in which refractive focusing lenses cannot be used.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 2A shows a side exploded view of the mirror assembly and its components. FIG. 2B shows a side sectional view of the assembled mirror assembly.

FIG. 3A shows a side exploded view of the mirror assembly and its components. FIG. 3B shows a side sectional view of the assembled mirror assembly.

FIGS. 8A-8D show a schematic illustration of a method for forming an off-axis variable focal length deformable mirror.

FIGS. 9A and 9B show views of an exemplary off-axis concave variable focal length deformable mirror assembly. FIG. 9A shows a side exploded view of the mirror assembly and its components. FIG. 9B shows a side sectional view of the assembled mirror assembly.

FIG. 10A shows a perspective view of the piston plate. FIG. 10B shows a side view of the piston plate in a vertical sectioning plane containing the minor axis of the outer elliptical ring. FIG. 10C shows a side view of the piston plate in a vertical sectioning plane containing the major axis of the outer elliptical ring. FIG. 10D shows a top view of the piston plate.

FIG. 11A shows a perspective view of the housing. FIG. 11B shows a side view of the housing in a vertical sectioning plane containing the major axis of the inner elliptical ring. FIG. 11C shows a side view of the housing in a vertical sectioning plane containing the minor axis of the inner elliptical ring. FIG. 11D shows a top view of the housing.

DETAILED DESCRIPTION OF THE INVENTION

The present invention is directed to a variable focal length deformable mirror having a theoretically perfect parabolic reflective surface, and a method for forming the deformable mirror by deforming a planar mirror plate of uniform thickness. Such a truly parabolic shape ensures tight focusing, free of aberrations. The parabolic mirror shape is formed by placing the planar mirror plate between two circular or elliptical pushing rings, the geometry of which are defined by parallel paraboloid sections. The mirror plate is simply supported by the rings. Such a simple support supplies a displacement constraint, without imposing a rotation constraint or moment on the plate. A variable clamping force is applied to the rings, thus deforming the flat plate, and the focal length of the resulting parabolic surface is directly related to the pushing ring displacement. Using this simple geometric method, either concave or convex parabolic mirrors of arbitrary focal length and off-axis angle can be produced from standard mirror blanks. The range of possible sizes is limited only by the strength and elasticity of the mirror plate and its reflective coating. By choosing an appropriate plate material, a nearly unlimited range of aperture sizes, focal lengths, and off-axis angles can be practically produced.

On-Axis Variable Focal Length Deformable Mirror

Figure 1A:
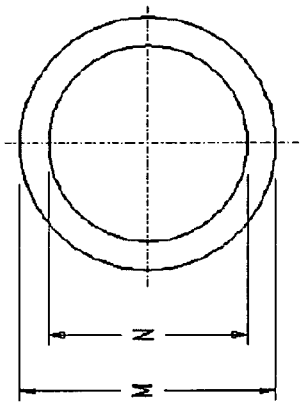
FIGS. 1A-1D show a schematic illustration of a method for forming an on-axis variable focal length deformable mirror.
Figure 1B:
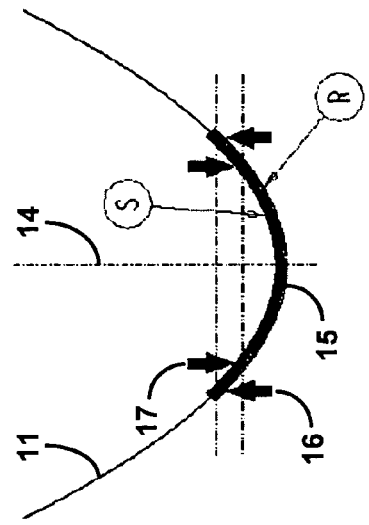
Figure 1C:
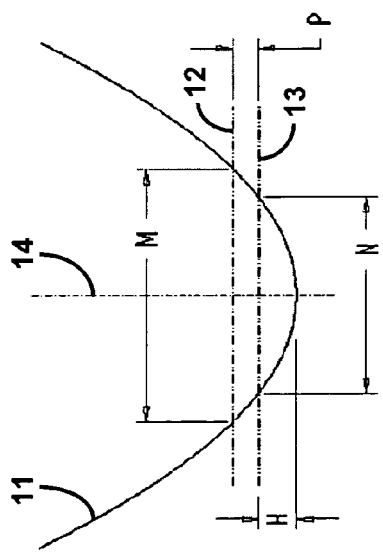
Figure 1D:
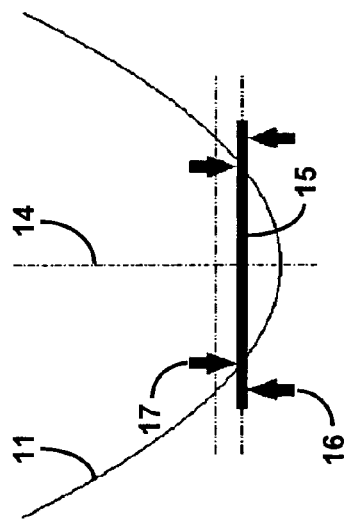

In FIGS. 1A-1D is shown a schematic illustration of the method of the present invention for forming an on-axis variable focal length deformable mirror having a parabolic mirror shape. In FIG. 1A is shown a two-dimensional cross-sectional side view of a paraboloid 11 intersected by two parallel planes 12 and 13 orthogonal to the view. The parallel planes 12 and 13 are perpendicular to the central axis 14 of the paraboloid 11 and are separated by a distance P. The intersection of planes 12 and 13 with the paraboloid 11 are concentric circles with diameters M and N centered on the central axis 14. In FIG. 1B is shown a top view of the resulting circular ring geometry, showing the concentric circles with diameters M and N. In FIG. 1C is shown a side view of an undeformed planar mirror plate 15 contacted by concentric circular pushing rings 16 and 17 having diameters M and N, respectively. In FIG. 1D is shown a side view of the mirror plate 15 that has been deformed to a desired on-axis parabolic shape, displaced by a variable clamping force applied to the mirror plate 15 by the outside 16 and inside 17 circular pushing rings. Note that either the concave S or convex R surface can be used as the reflective mirror.

Figure 2A:
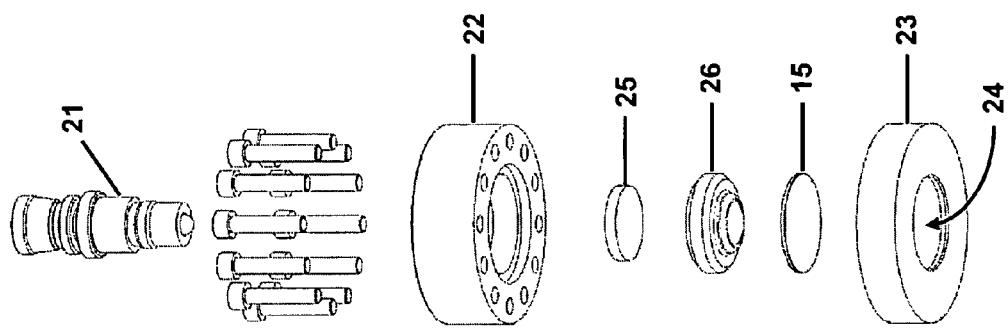
FIGS. 2A and 2B show views of an exemplary on-axis convex variable focal length deformable mirror assembly.
Figure 2B:
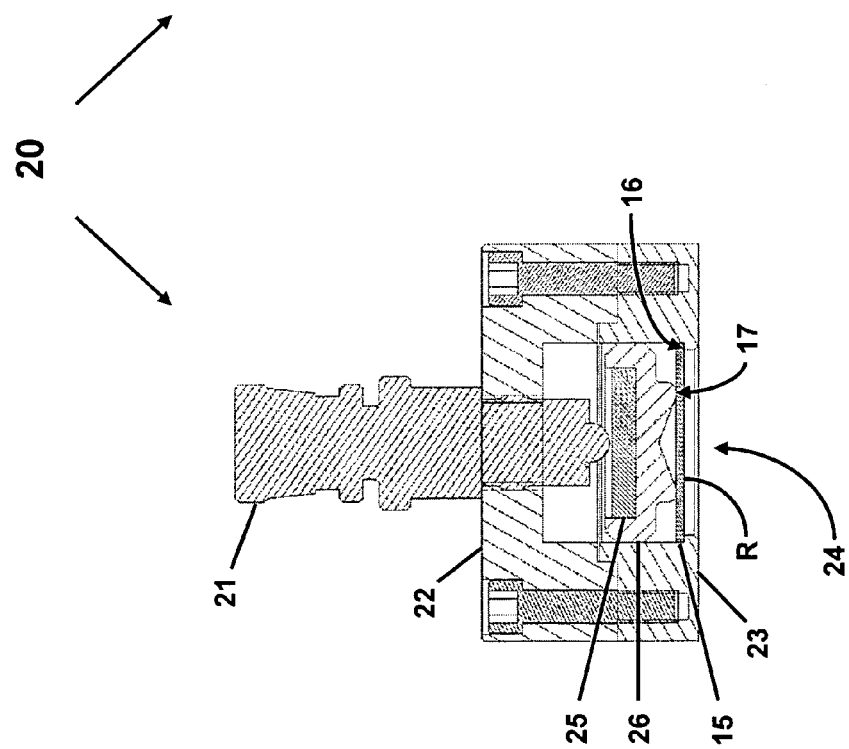

In FIGS. 2A and 2B are shown views of an exemplary deformable mirror assembly 20 that can be used to form an on-axis convex mirror with variable focal length by deforming a planar mirror plate 15 having a reflective surface R on the frontside. The mirror plate 15 is preferably axially symmetric. The mirror plate 15 is more preferably a round mirror plate. The mirror plate 15 can be glass, metal, plastic, ceramic, composite, or other deformable mechanical material. The assembly 20 can be made of mechanical materials that are lightweight and machinable, such as plastic, aluminum, and steel. Preferably, all materials are stress relieved or otherwise in a uniform state, since any inhomogeniety in the materials can potentially be manifested as an imperfection in the optical surface. The assembly can be designed to fit into a standard optic mount.

FIG. 2A shows a side exploded view of the on-axis convex deformable mirror assembly 20 and its components. The assembly 20 comprises an axial linear actuator 21 mounted in the center of a circular flange 22 that is affixed circumferentially on a hollow cylindrical housing 23. The flange 22 can be made of aluminum to adequately support the force from the actuator 21. The housing 23 has a central bore 24 to enable light to enter and be reflected off of the mirror surface R. The housing 23 can be an easily machinable plastic, such as Delrin®. The actuator 21 can be fixed or it can be an adjustable actuator, such as a manual or electronic micrometer screw, an electromagnetic rod, a fluid or gas-driven rod, or a piezo crystal. For example, using a piezo driver as the actuator 21 enables a very fast closed loop system for adaptive optics applications. The linear actuator 21 pushes on the backside of a disk 25. The disk 25 can in turn push on the backside of a piston plate 26 that in turn pushes on the backside of the mirror plate 15. The disk 25 can be made of hardened tool steel to transfer the point load of the actuator 21 to the piston plate 26. The piston plate 26 can be made, for example, of a machinable plastic or metal.

FIG. 2B shows a side sectional view of the assembled on-axis convex deformable mirror assembly 20. The symmetry axis of the mirror plate 15 (and the assembly 20) can intersect the center of concentric circular rings 16 and 17 and be perpendicular to the circular planes 12 and 13. The inner circular ring 17 on the frontside of the piston plate 26 pushes on the backside of the mirror plate 15. The inner ring 17 can be a rounded boss or raised ridge on the piston plate 26 that approximates a line contact throughout the range of deformation of the mirror plate 15, thereby providing a simple support. The outer edge of the round mirror plate 15 is retained by the outer circular ring 16 that is provided by a rounded boss on the mirror-side of a shoulder extending radially inward into the central bore 24 from the inside wall of the housing 23. The bosses are preferably a soft plastic, so that they can easily slide on the hard surfaces of the mirror plate 15 and nullify minor machining errors in the bosses as the mirror plate 15 deforms. However, it has been found that adequate sliding contact is also obtained when the rounded bosses are a hard metal. A variable clamping force is provided by the force of the inner ring 17 pushing onto the backside, and the reaction force of the outer ring 16 pushing onto the frontside, of the mirror plate 15, thereby creating a theoretically perfect parabolic deformation within the encircled area of the ring 17.

Because the pushing rings 16 and 17 provide primarily a displacement constraint, rather than a force constraint, the portion of the mirror plate 15 lying outside of the outer ring 16, and its stress distribution, has little effect on the shape taken by the mirror plate 15 within the inner ring 17. Therefore, the mirror plate 15 need not be round. However, it is necessary that the planes 12 and 13 of the two pushing rings 16 and 17 remain planar and parallel to accurately provide the displacement constraint. With the assembly 20, force is applied to the piston plate 26 at only one point, and the pushing rings 16 and 17 are not constrained to be parallel. Therefore, this design relies on symmetry to maintain the planarity and parallelism of the pushing rings 16 and 17. This is most easily accomplished with a round mirror plate. However, other non-circular mirror plates that are substantially symmetric about an axis perpendicular to the plane of the plate, such as elliptical, square, rectangular, or triangular, can also be used. For non-circular mirror plates, the non-circular symmetry will induce a non-uniform stress profile in the pushing rings 16 and 17, which may deform them out of plane as force is applied to them. This non-uniform stress profile may or may not be acceptable, depending on the stiffness of the pushing rings and the optical quality desired of the mirror. Therefore, the circular rings 16 and 17 can be shaped to be stiffer in areas of higher stress and more flexible in areas of lower stress to enable the loaded pushing rings 16 and 17 to remain planar as the mirror plate 15 is deformed. The preferred shapes can be determined by finite element analysis.

The frontside reflective surface of the mirror plate 15 thereby provides a convex parabolic mirror R. The reflective surface can be a polished or machined surface (e.g., copper or molybdenum), deposited reflective coating (e.g., gold, silver, or aluminum), dielectric multilayer coating, or the like, depending on the wavelength and intensity of the incident light and the mirror quality desired.

Figure 3A:
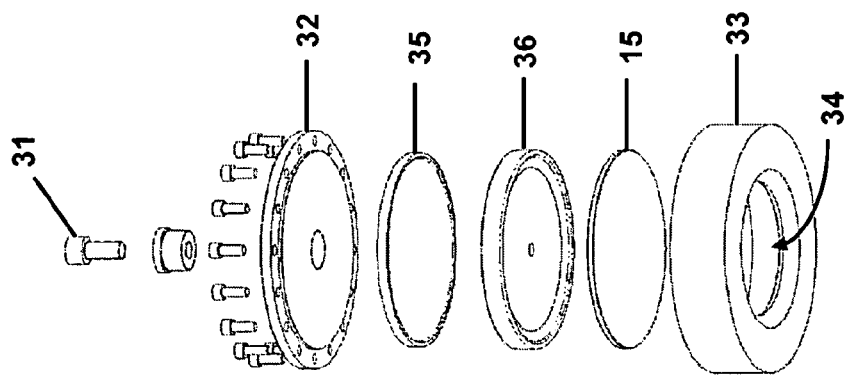
FIGS. 3A and 3B show views of an exemplary on-axis concave variable focal length deformable mirror assembly.
Figure 3B:
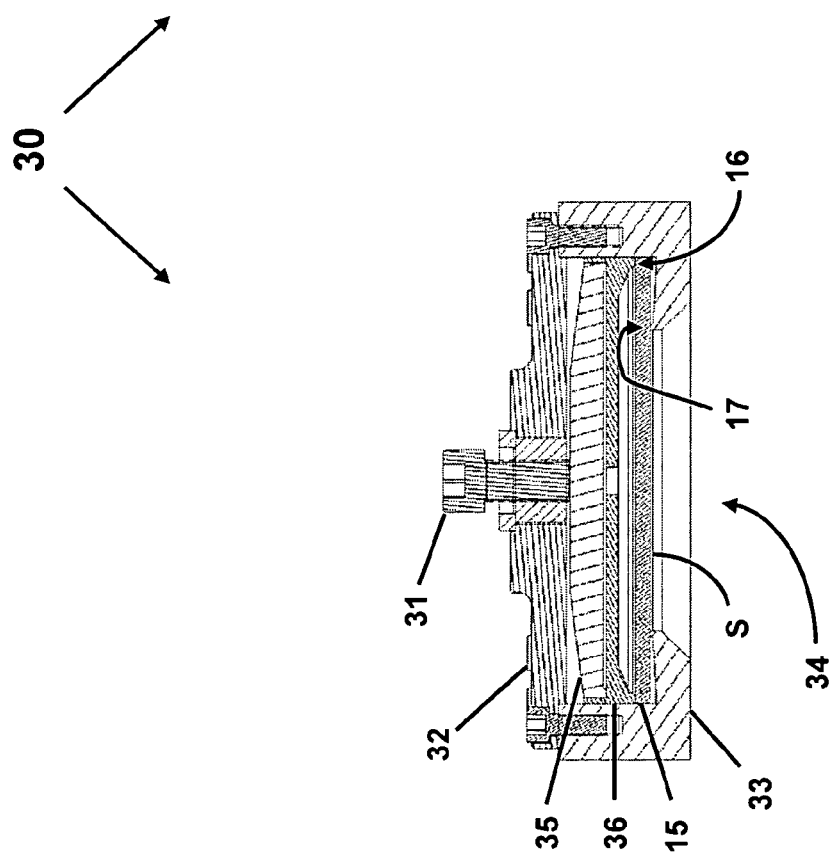

In FIGS. 3A and 3B are shown views of an exemplary deformable mirror assembly 30 that can be used to form an on-axis concave mirror with variable focal length by deforming a planar mirror plate 15 having a reflective surface S on the frontside. The mechanical principle of the concave deformable mirror is very similar to the convex mirror. However, instead of pushing the mirror plate 15 with an inner ring that is smaller than the retaining ring, the concave mirror assembly 30 pushes the mirror plate 15 with an outer ring 16 that has a diameter that is larger than the diameter of the retaining ring 17. The resulting concave deflections are equivalent, but in opposite direction to the convex deflections.

FIG. 3A shows a side exploded view of the on-axis concave deformable mirror assembly 30 and its components. The assembly 30 comprises an axial linear actuator 31 mounted in the center of a circular flange 32 that is affixed circumferentially on a hollow cylindrical housing 33. The housing 33 has a central bore 34 to enable light to enter and be reflected off of the mirror surface S. The actuator 31 can be fixed or it can be an adjustable actuator, such as a manual or electronic micrometer screw, an electromagnetic rod, a fluid or gas-driven rod, or a piezo crystal. The actuator 31 pushes on the backside of a disk 35. The disk 35 can in turn push on the backside of a piston plate 36 that in turn pushes on the backside of the mirror plate 15.

FIG. 3B shows a side sectional view of the assembled on-axis concave deformable mirror assembly 30. The inner retaining ring 17 can be a rounded boss or raised ridge on the mirror-side of a shoulder extending radially inward into the central bore 34 from the inside wall of the housing 33. The outer ring 16 on piston plate 26 pushes onto the backside of the mirror plate 15 that is pushed back on by inner retaining ring 17, thereby providing a variable clamping force that results in a theoretically perfect parabolic deformation within the encircled area of the circular ring 17. The frontside reflective surface of the mirror plate 15 thereby provides a concave parabolic mirror S.

An annular ring pushing on a flat round plate with a simply supported concentric circular edge restraint will always lead to a parabolic surface deformation inside the ring diameter. The parabolic surface deformation can be calculated using the analytical solution for a solid circular plate under a uniform annular line load given in Y. C. Warren and B. G. Richard, *Roark's Formulas for Stress and Strain*, McGraw-Hill, New York, 7$^{th}$ ed. (2002). These formulas assume a thin, flat round plate of uniform thickness and of homogenous, isotropic material. Furthermore, the formulas assume that the maximum deflection is not more than about one-half the plate thickness and that the plate is nowhere stressed beyond the elastic limit. For larger deflections, the plate is stiffer than indicated by the simple formulas.

For a given line force w, the deflected profile y(r) inside the inner pushing ring radius $r_0$ is given by:

$$y(r) = y_c + \frac{M_c r^2}{2D(1+v)}, \quad (1)$$

where $$y_c = -\frac{wa^3}{2D}\left(\frac{L_9}{1+v} - 2L_3\right) \quad (2)$$

is the center deflection, a is the radius of the round plate, r (with $0 \leq r \leq r_0$) is the radius, $M_c = waL_9$ is the moment at the center, $D = Et^3(12(1-v^2))$, E is the modulus of elasticity of the mirror plate material, t is the thickness of the plate, v is Poisson's ratio, and $L_9$ and $L_3$ are constants given below:

$$L_9 = \frac{r_0}{a}\left[\frac{1+v}{2}\ln\frac{a}{r_0} + \frac{1-v}{4}\left[1 - \left(\frac{r_0}{a}\right)^2\right]\right], \quad (3)$$

and $$L_3 = \frac{r_0}{4a}\left[\left[\left(\frac{r_0}{a}\right)^2 + 1\right]\ln\frac{a}{r_0} + \left(\frac{r_0}{a}\right)^2 - 1\right]. \quad (4)$$

Eq. (1) is valid for values of $0.2 \leq r_0/a \leq 0.8$. Once $r_0/a$ exceeds 0.8, the ring radius $r_0$ approaches the plate radius a, and these equations become invalid. For $r_0/a$ below 0.2, the deformation can be modeled using a point load. For a point force W pushing on the center of the round plate, the deflected profile y(r) is given by:

$$y(r) = \frac{W}{16\pi D}\left[\frac{3+v}{1+v}(a^2 - r^2) - 2r^2\ln\frac{a}{r}\right]. \quad (5)$$

Eq. (5) indicates that a point load cannot provide a surface deformation that is parabolic or even spherical.

Referring now to FIGS. 1A-1D for the on-axis deformable mirror, the piston displacement P necessary to produce a desired focal length f can be determined for a given set of outer and inner ring diameters M (where M=2a) and N (where N=2$r_0$), according to $$P = \frac{(M^2 - N^2)}{16f}. \quad (6)$$

Therefore, the f-number of the parabolic mirror is $$f\# = \frac{f}{N}. \quad (7)$$

For the case of an inner ring pushing on a mirror plate that is retained by an outer ring, the center deflection H (where H=$y_c$–P) of the mirror from the plane of the $$H = \frac{N^2}{16f}. \quad (8)$$

The maximum bending stress in the on-axis deformable mirror plate and the variable clamping force necessary to deform the plate can be determined from the thickness of the mirror plate and the mechanical properties of the mirror plate material. The maximum bending stress σ is given by $$\sigma = \frac{M_c}{t^2}, \quad (9)$$

and the variable clamping force R on the piston is $$R = 2\pi r_0 w. \quad (10)$$

The line force is related to the piston displacement according to $$w = \frac{P}{K_1 + \frac{K_2 r_0^2}{2D(1+v)}}, \quad (11)$$

where $$K_1 = \frac{y_c}{w} = \frac{-a^3}{2D}\left(\frac{L_9}{(1+v)} - 2L_3\right) \text{ and } K_2 = \frac{M_c}{w} = aL_9.$$

The focal length f (and aperture size) of the deformable mirror can be easily varied by changing the mechanical properties and dimensions of the mirror plate 15, the diameters M and N of the circular rings 16 and 17, and the variable clamping force that the pushing rings 16 and 17 exert on the mirror plate 15. The shortest focal length is only limited by material failure. The aperture size is only limited by the available mirror plate sizes and the required force. For example, with the convex mirror assembly 20, the diameter N of the inner pushing ring 17 can be easily varied by changing out replaceable piston plate 26. With the concave mirror assembly 30, the diameter N of the inner retaining ring 17 can be easily varied by changing out the housing 33. The clamping force can be easily varied by adjusting the linear actuator 21. The assembly can, in principle, be scaled to any size. Furthermore, the assembly can be actively cooled for applications such as high power laser welding.

Figure 4:
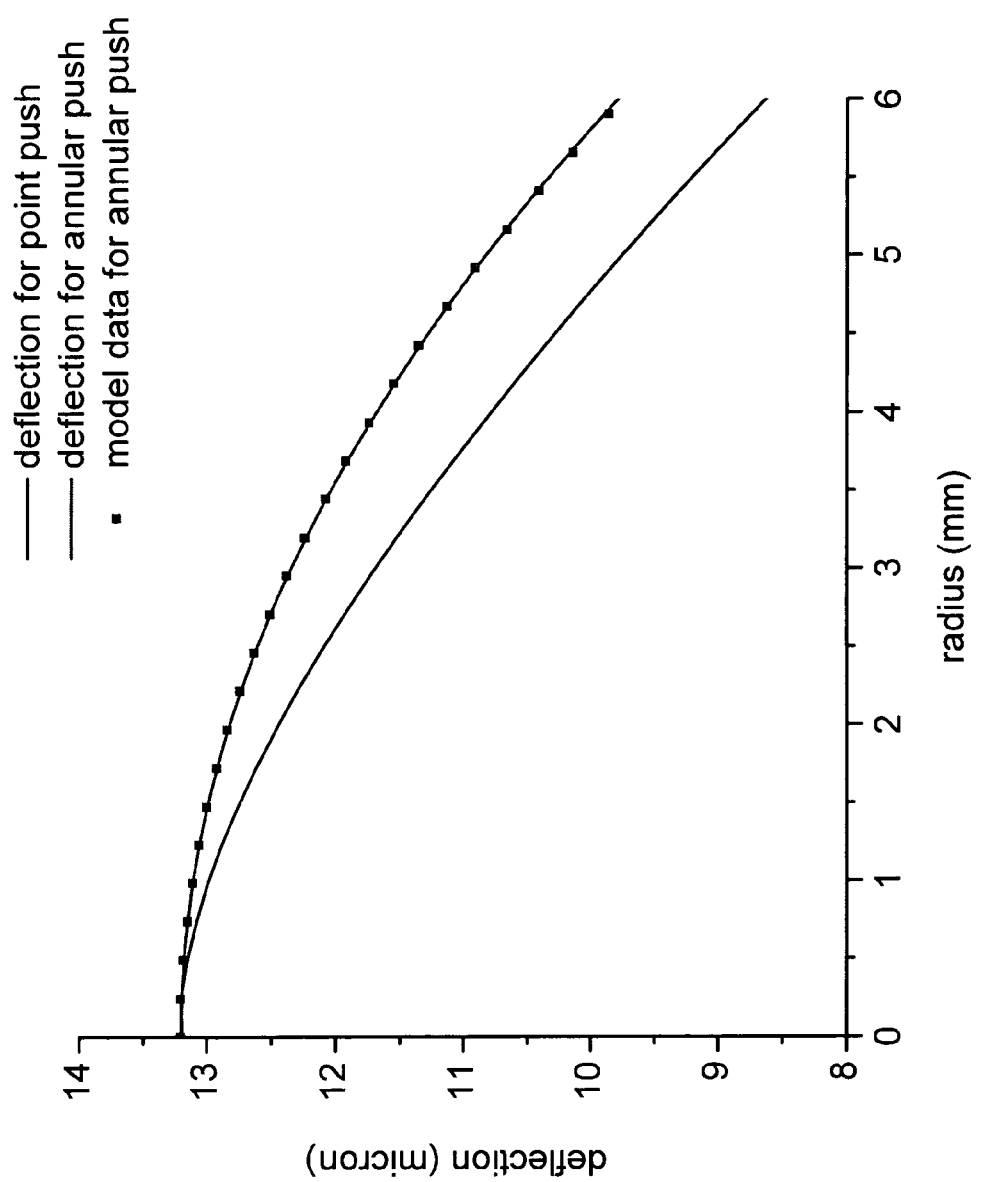
FIG. 4 shows plots of finite element model solutions and an analytical solution for the deflected profile for an annular circular ring pushing on a 25.4 mm diameter, 3.2 mm thickness BK7 optical glass mirror plate with a simply supported concentric circular edge restraint that produces a 13.2 µm center deflection. Also shown is an analytical solution for a point-like center pusher.

The deformation calculated using the analytical solutions for the on-axis convex deformable mirror assembly were verified using a one-fourth finite element model of the behavior of a simply supported mirror plate under a uniformly distributed annular force. In FIG. 4 is shown a comparison between the finite element model solutions and the analytical solution for the deflected profile y(r) for an M=25.4 mm diameter BK7 optical glass mirror plate with a thickness of t=3.2 mm and a center deflection of $y_c$=13.2 μm. The BK7 glass material had a modulus of elasticity of E=82×10$^9$ Pa and a Poisson ratio of ν=0.206. An inner annular ring of radius $r_0$=6 mm was used to push on the mirror plate. The agreement between the analytical deflected profile, calculated using Eq. (1), and the finite element model data is very good. Also shown in FIG. 4 is the analytical deflected profile using a point-like center pusher, calculated using Eq. (5). As expected, the deflection for the point push is non-parabolic and does not agree with the model data.

Figure 5:
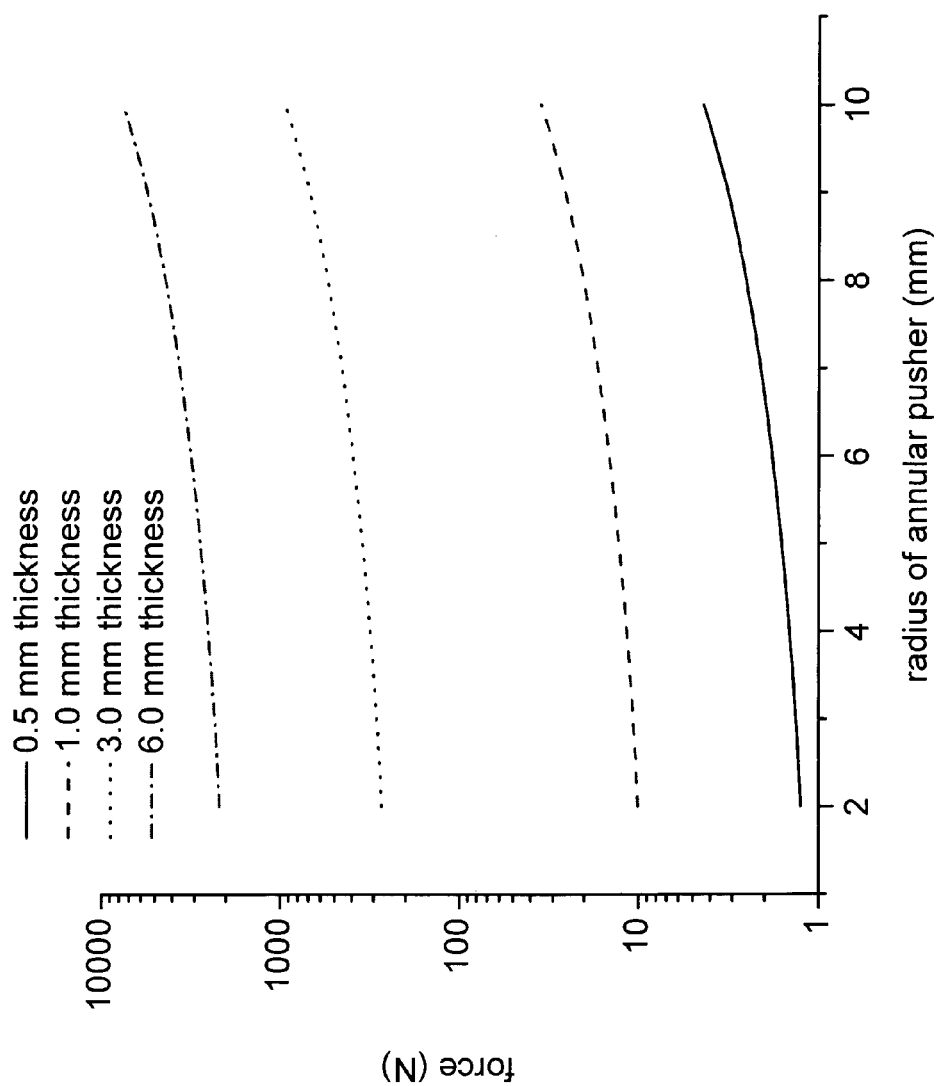
FIG. 5 shows a plot of the force needed to achieve a center deflection of 13.2 µm for various radii of an inner circular ring pushing on a 25.4 mm diameter BK7 mirror plates of various thicknesses.

The usable aperture of the mirror plate can be expanded by increasing the inner pusher ring diameter. This will not affect the parabolic deflection of the mirror plate within the enclosed area, but it will increase the force required on the inner pusher ring. In FIG. 5 is shown a plot of the force needed to achieve a center deflection of $y_c$=13.2 μm for various radii $r_0$ of an inner circular ring pushing on M=25.4 mm diameter mirror plates of various thicknesses, calculated using Eq. (2). The force required to achieve a given center deflection increases with plate thickness and radius of the annular pusher.

Figure 6:
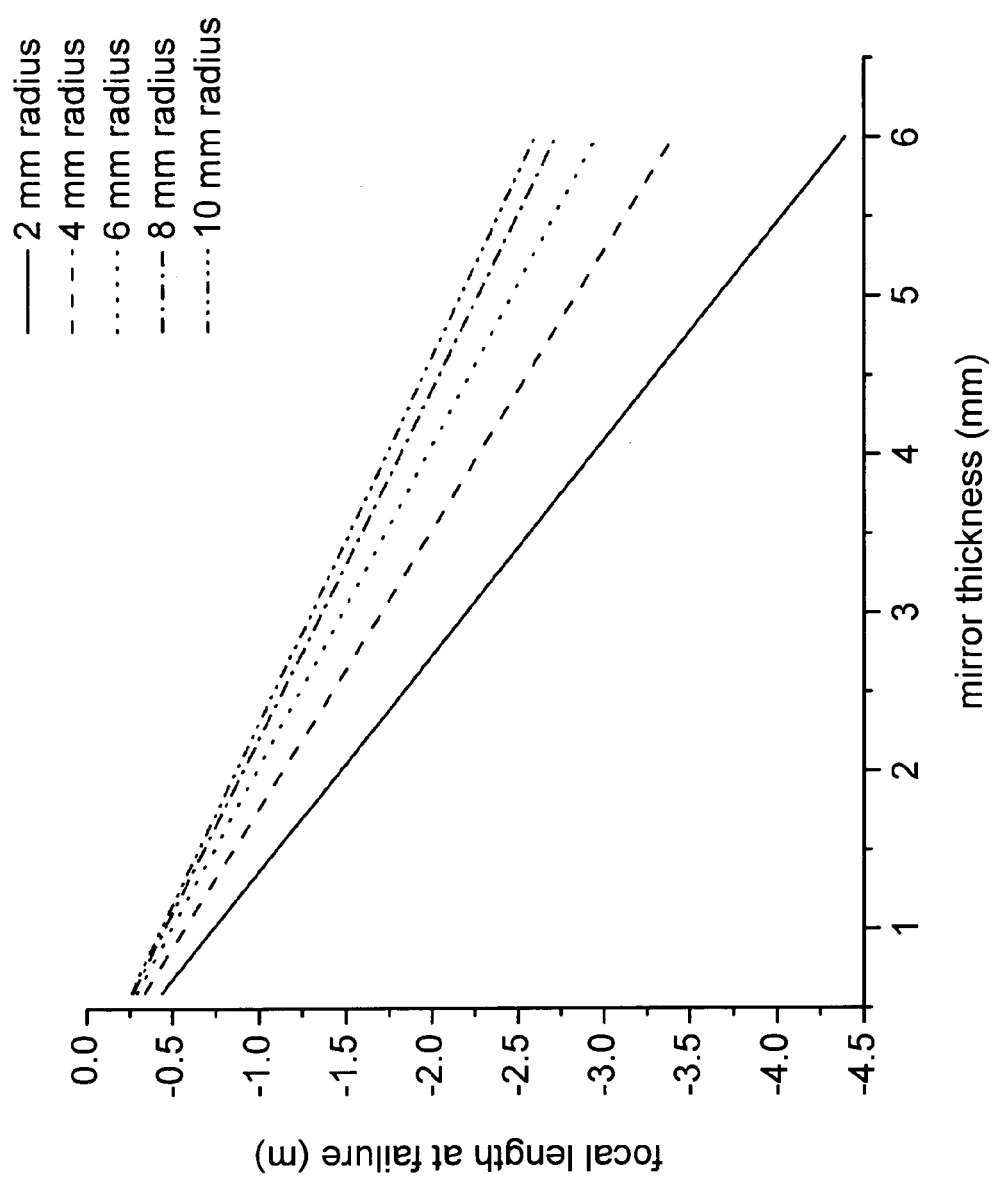
FIG. 6 shows a plot the shortest focal length obtainable versus BK7 mirror plate thickness for several inner pusher ring radii.

The maximum deflection will determine the shortest achievable focal length of the deformable mirror. The shortest focal length is limited by the maximum tensile stress that can be applied to the mirror plate, according to Eq. (9). For BK7 glass material, the maximum tensile stress is 51.7 MPa (7500 PSI). In FIG. 6 is shown a plot the shortest focal length obtainable versus BK7 mirror plate thickness for several inner pusher radii. The achievable focal length increases (note that the focal lengths are negative) with decreasing mirror plate thickness and decreases with pusher radius, since stresses will be reduced for thinner plates and for plates pushed closer to the outer edge. For many applications, there is an optimal mirror plate thickness and pusher radius that will satisfy the optical requirements of the desired application.

A Hartman sensor was used to perform careful waveform measurements on the on-axis convex deformable mirror assembly. After taking a baseline measurement with a flat reference mirror, the deformable mirror was deformed by slowly turning a micrometer actuator at the back of the mirror assembly to obtain reflected wavefront data at various focal lengths. Measurements were performed on a 25.4 mm diameter, 1 mm thick, BK7 mirror plate with a 1054 nm reflective coating at 0°; and 25.4 mm diameter, 3.2 mm thick, BK7 mirror plate with a 1054 nm reflective coating at 0°.

Figure 7B:
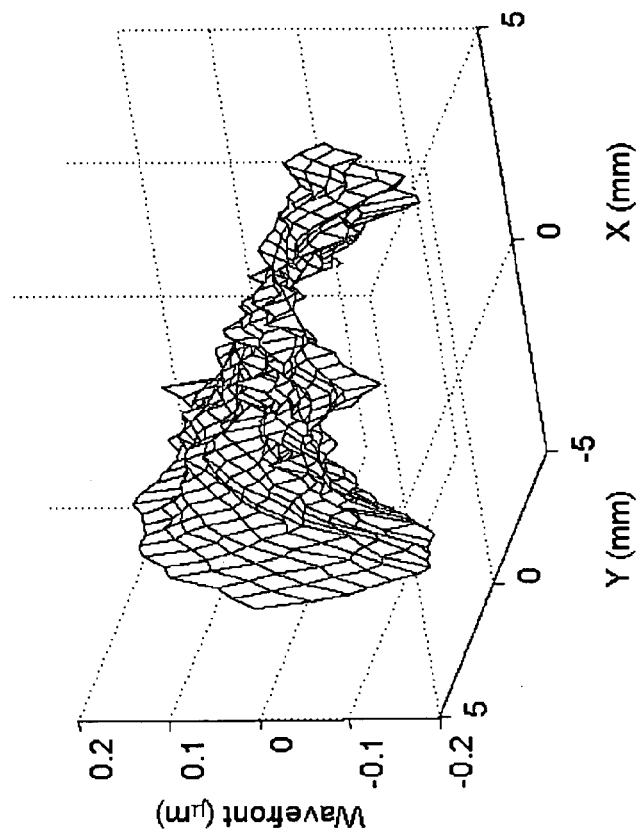
FIG. 7B shows an error plot of the measured wavefront.
Figure 7A:
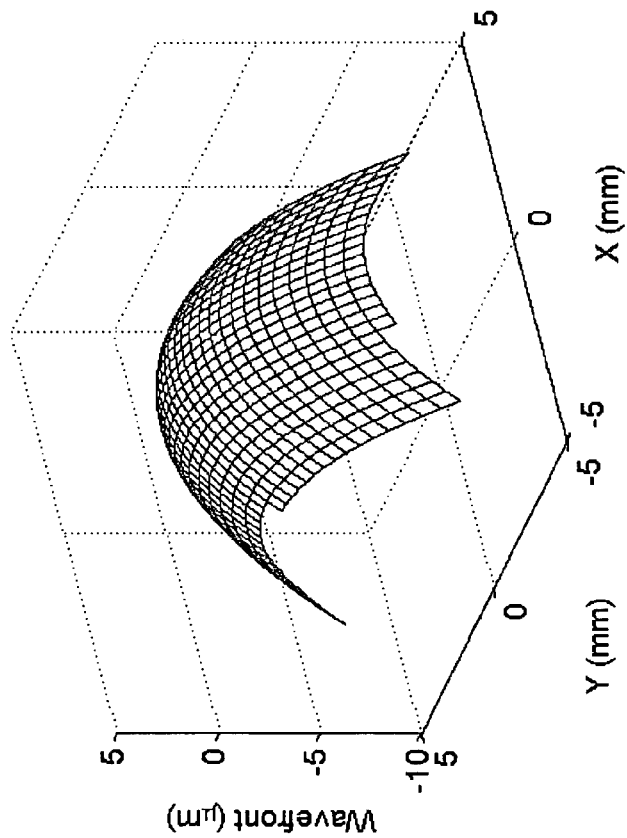
FIG. 7A shows a plot of the reflected wavefront for an on-axis convex mirror measured using a Hartman sensor.

Using Matlab, the data was plotted and fitted to a sphere to determine the radius R of the wavefront. In FIG. 7A is a plot of the measured reflected wavefront for an on-axis convex mirror that used the 1 mm thick mirror plate. Knowing the distance d of the wavefront sensor from the deformable mirror, the focal length f of the convex mirror was approximately f=R−d=77 cm. In FIG. 7B is shown an error plot of the same measurement, depicting the difference between measured data and fit. This saddle-like surface is typical for all the measurements taken and suggests a minor astigmatism, possibly due to machining errors in the parts or anisotropy in the materials. These errors could be reduced by requiring tighter tolerances and by carefully choosing the appropriate materials. Note that, for thin optics, a wedge in the mirror plate can have a large influence on astigmatism. Therefore, the mirror plate should preferably have a wedge angle of less than 10 arcseconds.

Tables 1 and 2 show detailed measurements of the focal lengths for the 1 mm thick and 3.2 mm thick mirror plates, respectively. In these tables, "f" is the focal length in meters, "error" is the standard deviation of focal length measurement, "RMS" is the root-mean-squared wavefront deviation of the measured data from spherical fit in micrometers, "80% spot" is the size in micrometers of the geometrically estimated spot that contains 80% of the laser power, "d.l. spot" is the diffraction limited spot size in micrometers assuming Gaussian beam propagation, and "80% angle" indicates that 80% of the wavefront had an angular deviation in microradians from the fit that is less than this value.

The tables indicate that the focal length of the deformable mirror can be varied from tens of meters down to the sub-meter scale. The error in focal length was calculated by taking the standard deviation of forty circular fits to equally spaced lineouts around the sphere. The larger errors in measurement for long focal lengths are due to the fact that the center deformation of the mirror is on the order of, or less than, the wavelength. Hence, small errors in the wavefront will have a large effect on the fitted sphere and on the resulting calculated focal length. The RMS wavefront deviation for the 1 mm thick mirror was less than λ/10, and less than about λ/30 for the 3.2 mm thick mirror at λ=1054 nm.

The tables also show a comparison between the theoretical diffraction limited spot diameter and the estimated actual spot diameter calculated geometrically from the wavefront data. The diffraction limited spot diameter was calculated according to d=4λf/πb, where λ=1054 nm is the wavelength, f is the focal length, and b is the beam diameter. The estimated spot diameter S, the 80% spot, was found by calculating the 3D angular deviation of the wavefront from the spherical ideal at discrete points over its surface. The 80% angle, A, was then found such that 80% of the wavefront surface area had an angular deviation less than or equal to A. S can then be found geometrically according to S=2(f*arctan(A)). Note that for a diverging convex mirror, the image is imaginary. However, spot diameter is still a useful gauge of mirror quality since it will be relayed through the downstream optical train. As can be seen from the tables, the experimental spot size was within a factor of two of the theoretical minimum value.

TABLE 1

Measured focal lengths for a 1 mm thick, 25.4 mm diameter on-axis convex deformable mirror at a wavelength of 1054 nm.

| f (m) | error (m) | RMS (μm) | 80% spot (μm) | d.l. spot (μm) | 80% angle (μrad) |
|---|---|---|---|---|---|
| 60.04 | 39.20 | 0.047 | 8133 | 5881 | 67.73 |
| 16.16 | 4.06 | 0.077 | 3028 | 1582 | 93.70 |
| 8.64 | 1.41 | 0.094 | 1953 | 846 | 113.05 |
| 5.52 | 0.77 | 0.111 | 1452 | 541 | 131.53 |
| 4.24 | 0.48 | 0.115 | 1194 | 415 | 140.85 |
| 3.00 | 0.28 | 0.118 | 926 | 294 | 154.21 |
| 2.25 | 0.14 | 0.099 | 578 | 220 | 128.45 |
| 1.80 | 0.10 | 0.091 | 461 | 177 | 127.87 |
| 1.47 | 0.06 | 0.075 | 302 | 144 | 102.73 |
| 1.29 | 0.06 | 0.069 | 268 | 127 | 103.90 |

TABLE 1-continued

Measured focal lengths for a 1 mm thick, 25.4 mm diameter on-axis convex deformable mirror at a wavelength of 1054 nm.

| f (m) | error (m) | RMS (μm) | 80% spot (μm) | d.l. spot (μm) | 80% angle (μrad) |
|---|---|---|---|---|---|
| 1.09 | 0.04 | 0.059 | 208 | 107 | 95.42 |
| 0.96 | 0.03 | 0.055 | 177 | 94 | 92.40 |
| 0.86 | 0.02 | 0.050 | 148 | 84 | 86.12 |
| 0.77 | 0.02 | 0.048 | 126 | 75 | 81.54 |
| 0.71 | 0.02 | 0.056 | 132 | 70 | 92.58 |
| 0.65 | 0.02 | 0.054 | 120 | 64 | 92.65 |
| 0.60 | 0.02 | 0.063 | 111 | 59 | 92.64 |
| 0.57 | 0.02 | 0.102 | 127 | 56 | 110.85 |

TABLE 2

Measured focal lengths for a 3.2 mm thick, 25.4 mm diameter on-axis convex deformable mirror at a wavelength of 1054 nm.

| f (m) | error (m) | RMS (μm) | 80% spot (μm) | d.l. spot (μm) | 80% angle (μrad) |
|---|---|---|---|---|---|
| 83.81 | 71.04 | 0.022 | 8558 | 8209 | 51.05 |
| 55.62 | 19.42 | 0.021 | 5572 | 5447 | 50.09 |
| 40.63 | 8.58 | 0.024 | 4508 | 3979 | 55.47 |
| 26.78 | 6.20 | 0.032 | 3186 | 2623 | 59.47 |
| 19.17 | 3.63 | 0.037 | 2438 | 1877 | 63.60 |
| 16.17 | 2.28 | 0.032 | 2133 | 1584 | 65.94 |
| 12.98 | 1.57 | 0.033 | 1670 | 1272 | 64.30 |
| 9.42 | 0.82 | 0.034 | 1113 | 923 | 59.05 |
| 8.46 | 0.56 | 0.030 | 1000 | 829 | 59.09 |
| 7.12 | 0.41 | 0.031 | 840 | 697 | 58.97 |
| 6.33 | 0.33 | 0.031 | 786 | 620 | 62.10 |
| 5.65 | 0.30 | 0.031 | 770 | 554 | 68.08 |

Off-Axis Variable Focal Length Deformable Mirror

The mechanical principle of the on-axis deformable mirror can be generalized to provide a deformable mirror with an off-axis aperture. In FIGS. 8A-8D is shown a schematic illustration of the method of the present invention for forming an off-axis variable focal length deformable mirror. In FIG. 8A is shown a two-dimensional cross-sectional view of a paraboloid 11 intersected by two parallel planes 42 and 43 orthogonal to the view. The parallel planes 42 and 43 are at an arbitrary (depending on the desired application) off-axis angle to the central axis 14 of the paraboloid 11 and are separated by a distance P. The intersection of planes 42 and 43 with the paraboloid 11 are ellipses with major axes $M_0$ and $N_0$. Therefore, the ellipses are interrelated as parallel planar sections of a single paraboloid. In FIG. 8B is shown a view in the plane 42 of the resulting elliptical ring geometry, showing ellipses with collinear major axes $M_0$ and $N_0$ and offset minor axes $M_1$ and $N_1$, respectively. The centers of the ellipses are offset by a distance Z along the collinear major axes. In FIG. 8C is shown a side view of an undeformed planar mirror plate 15 contacted by elliptical pushing rings 46 and 47 having collinear major axes $M_0$ and $N_0$, respectively. In FIG. 8D is shown a side view of the mirror plate 15 that has been deformed to a desired off-axis parabolic shape, displaced by a variable clamping force applied to the mirror plate 15 by the outside 46 and inside 47 elliptical pushing rings. Note that either the concave S or convex R surface can be used as the reflective mirror.

In FIGS. 9A and 9B are shown views of an exemplary deformable mirror assembly 50 that can be used to form an off-axis concave mirror with variable focal length by deforming a planar mirror plate 15 having a reflective surface S on the frontside. FIG. 9A shows a side exploded view of the off-axis concave deformable mirror assembly 50 and its components. FIG. 9B shows a side sectional view of the assembled deformable mirror 50. The mirror plate 15 is clamped between opposed elliptical rings 46 and 47 of a piston plate 56 and a housing 53. The housing 53 has a central bore 54 to enable light to enter and be reflected off of mirror surface S. Force from gross 51 and fine 57 adjustment screws is transferred to the piston 56 through a floating pin lever 58 and a plunger 59. The lever 58 is located within a slot in a cap 52, and the plunger 59 is precisely located by a retainer 55. Other types of actuators, including a piezo driver, can also be used to push on the piston plate 56. The piston plate 56 is oriented accurately by pins 61 riding in slots 62 in the housing 53.

The symmetry axis of the mirror plate 15 (and the assembly 50) can intersect the collinear major axis of the elliptical rings 46 and 47 and be perpendicular to the elliptical planes 42 and 43. To minimize the size of the mirror plate 15, the outer ellipse 46 is preferably centered on the center of the mirror plate 15 and the inner ellipse 47 can be offset by a distance Z from the center along the collinear major axes. The elliptical rings 46 and 47 can be rounded bosses that slide easily relative to the surfaces of the mirror plate 15 as the mirror plate 15 deforms. A variable clamping force is provided by the force of the outer elliptical ring 46 pushing onto the backside and the reaction force of the inner elliptical retaining ring 47 pushing onto the frontside of the mirror plate 15, thereby creating a theoretically perfect parabolic deformation within the encircled area of the ring 47. The frontside reflective surface of the mirror plate 15 thereby provides a concave parabolic mirror S.

Unlike the on-axis deformable mirror assemblies 20 or 30, the off-axis deformable mirror assembly 50 is not radially symmetric. Therefore, the stress distribution resulting from deforming the mirror plate 15 is not radially symmetric in the off-axis assembly 50. Consequently, the mirror plate 15 is preferably symmetric about two orthogonal planes through both the major and minor axes of the ellipses 42 and 43 (i.e., an elliptical mirror plate) and has a symmetry axis along the intersection of these orthogonal planes. However, non-elliptical mirror plates that are substantially symmetric about these planes, such as circular, square, or rectangular, can also be used. In particular, a round mirror plate is easy to obtain and assemble. Regardless of the mirror plate geometry, the elliptical rings 46 and 47 are preferably shaped to be stiffer in areas of higher stress and more flexible in areas of lower stress to enable the loaded elliptical pushing rings 46 and 47 to remain planar as the mirror plate 15 is deformed. The preferred shapes that substantially correct for the non-uniform stress distribution resulting from both the elliptical pushing geometry and a non-elliptical mirror plate can be determined by finite element analysis.

Figure 10B:
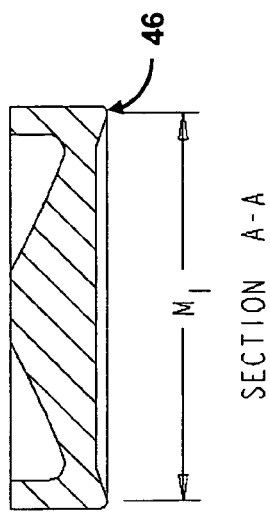
FIGS. 10A-10D show views of the piston plate of the off-axis concave deformable mirror assembly.
Figure 10D:
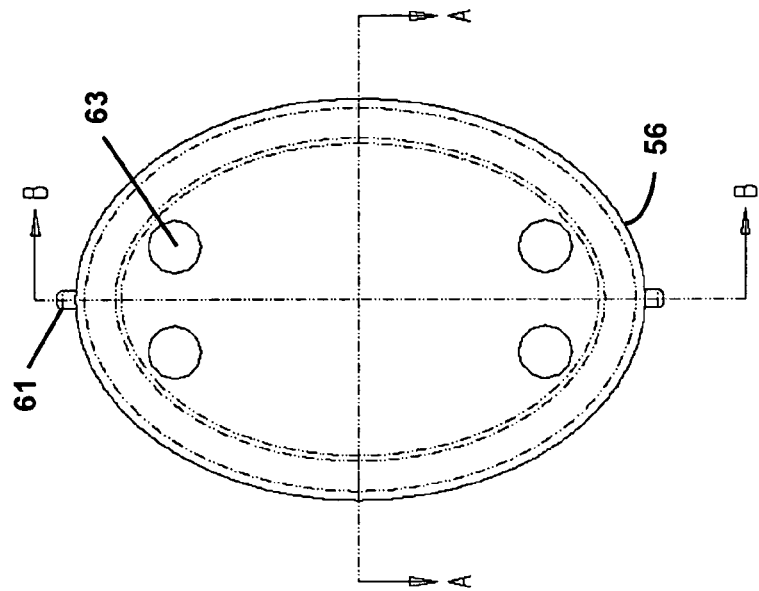
Figure 10A:
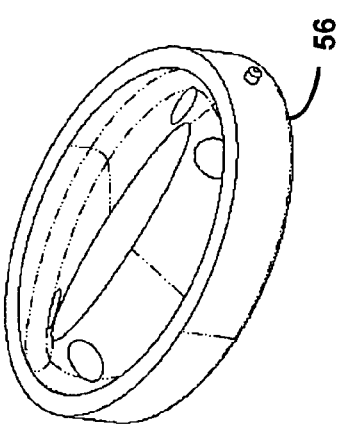
Figure 10C:
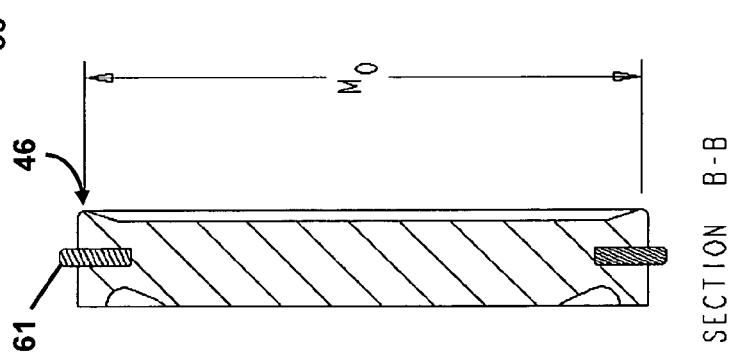

In FIGS. 10A-10D are shown views of the piston plate 56 of the off-axis concave deformable mirror assembly 50. In FIG. 10A is shown a perspective view of the piston plate 56. In FIG. 10B is shown a side view of the piston plate 56 in a vertical sectioning plane containing the minor axis $M_1$, showing the rounded boss of the outer elliptical ring 46. In FIG. 10C is shown a side view of the piston plate 56 in a vertical sectioning plane containing the major axis $M_0$, showing the rounded boss of the outer elliptical ring 46. As in shown FIG. 1C, the section of the piston plate 56 supporting the elliptical ring 46 along the major axis $M_0$ is thicker than the piston plate section along the minor axis $M_1$ shown in FIG. 10B, thereby enabling the loaded elliptical pushing ring 46 to remain planar as the mirror plate 15 is deformed. In FIG. 10D is shown a top view of the piston plate 56. Holes 63 in the piston plate 56 can also be used to shape the stiffness profile. The piston plate 56 can be oriented accurately by pins 61 that ride in slots 62 in the housing 53.

Figure 11B:
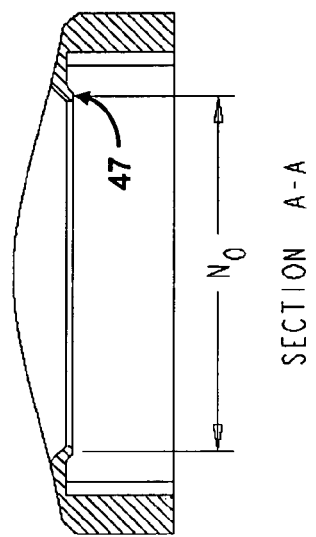
FIGS. 11A-11D show views of the housing of the off-axis concave deformable mirror assembly.
Figure 11D:
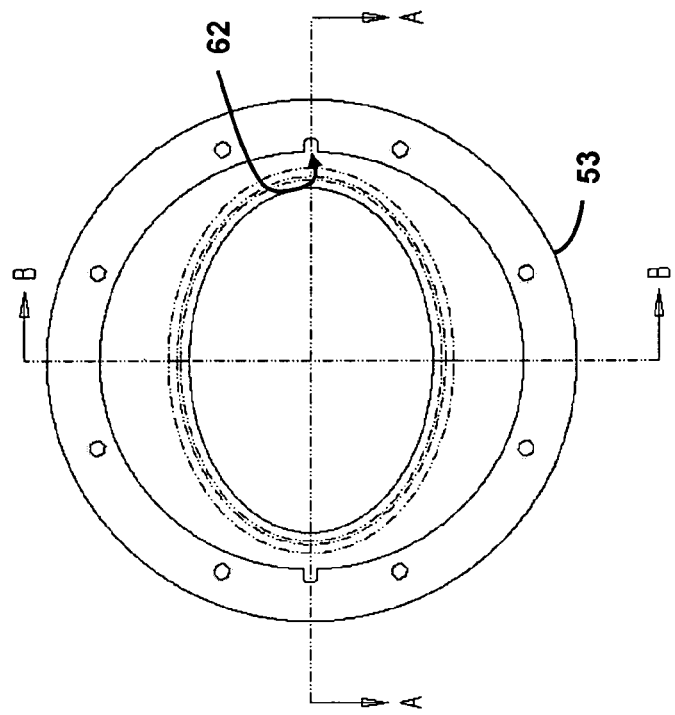
Figure 11A:
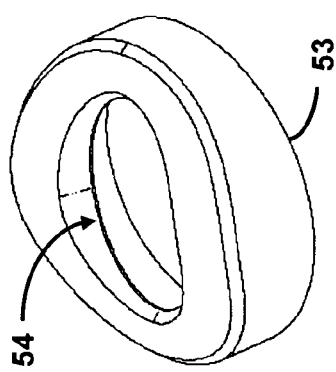
Figure 11C:
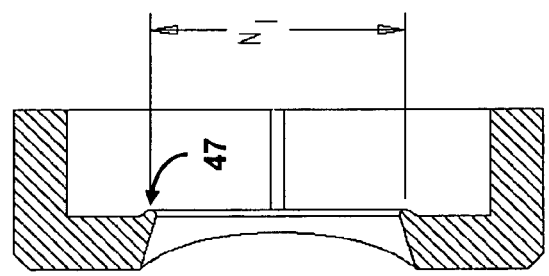

In FIGS. 11A-11D are shown views of the housing 53 of the off-axis concave deformable mirror assembly 50. In FIG. 11A is shown a perspective view of the housing 53 with central bore 54. In FIG. 11B is shown a side view of the housing 53 in a vertical sectioning plane containing the major axis $N_0$, showing the rounded boss of the inner elliptical ring 47. In FIG. 11C is shown a side view of the housing 53 in a vertical sectioning plane containing the minor axis $N_1$, showing the rounded boss of the inner elliptical ring 47. As shown in FIG. 11C, the section of the housing 53 supporting the inner elliptical ring 47 along the minor axis $N_1$ is thicker than the housing section along the major axis $N_0$ shown in FIG. 11B, thereby enabling the loaded elliptical pushing ring 47 to remain planar as the mirror plate 15 is deformed. In FIG. 11D is shown a top view of the housing 53. Pins 61 in the piston plate 56 can ride in slots 62 in the housing 53.

For the off-axis deformable mirror, the piston displacement P, ellipse offset Z, and minor axes $M_1$ and $N_1$ of the outer and inner elliptical rings 46 and 47, necessary to produce a desired focal length f at an off-axis angle θ can be determined for a given set of outer and inner elliptical ring major axes $M_0$ and $N_0$, according to $$P = \frac{M_0^2 - N_0^2}{16f(1+m^2)^{3/2}}, \tag{12}$$

$$Z = mP, \tag{13}$$

$$M_1 = \sqrt{\frac{M_0^2}{(1+m^2)}}, \tag{14}$$

$$N_1 = \frac{N_0^2}{(1+m^2)}, \tag{15}$$

where m=tan θ.

For an off-axis variable focal length deformable mirror with a given clear aperture, the ellipse offset Z increases with shorter focal length, indicating a translation adjustment along the collinear major axis as the piston is displaced axially to vary the focal length. However, for most practical cases, the ellipse offset is very small and can be approximated as zero throughout the entire focal length range allowed by the strength of the mirror plate. For these cases, concentric ellipses (i.e., Z=0) can be used with a negligible performance detriment. However, for a very thin, very large, or very strong mirror plates deformed to achieve very short focal lengths, the change in the ellipse offset can be significant. In such cases, the only plane of symmetry is through the major axes of the ellipses. Therefore, the symmetry axis of the mirror plate (and the axis of the actuator) should preferably intersect the collinear major axis and be perpendicular to the elliptical planes, and be located along the collinear major axis so as to be aligned with the center-of-effort of the reaction force (i.e., between the centers of the two ellipses). For cases with a significant ellipses offset, the assembly can be designed, by a finite element analysis of the loaded assembly, to operate within a specific limited focal length range with a constant Z. Alternatively, the assembly can provide for a transverse piston displacement corresponding to the axial displacement. This can be accomplished by angling the slots in the housing, or by providing a second linear actuator.

The maximum bending stress in the off-axis deformable mirror plate and the variable clamping force necessary to deform the plate can be approximated from the thickness of the mirror plate and the mechanical properties of the mirror plate material. The approximate maximum bending stress σ is given by $$\sigma = \frac{6M_c}{t^2}, \tag{16}$$

and the approximate variable clamping force R on the piston is $$R = 2\pi r_0 w, \tag{17}$$

where a=$M_1$/2; $r_0$=$N_1$/2; and D, $L_9$, $L_3$, $K_1$, $K_2$, w, $y_c$, $M_c$, E, σ, and t are as defined above for the on-axis case.

Figure 12B:
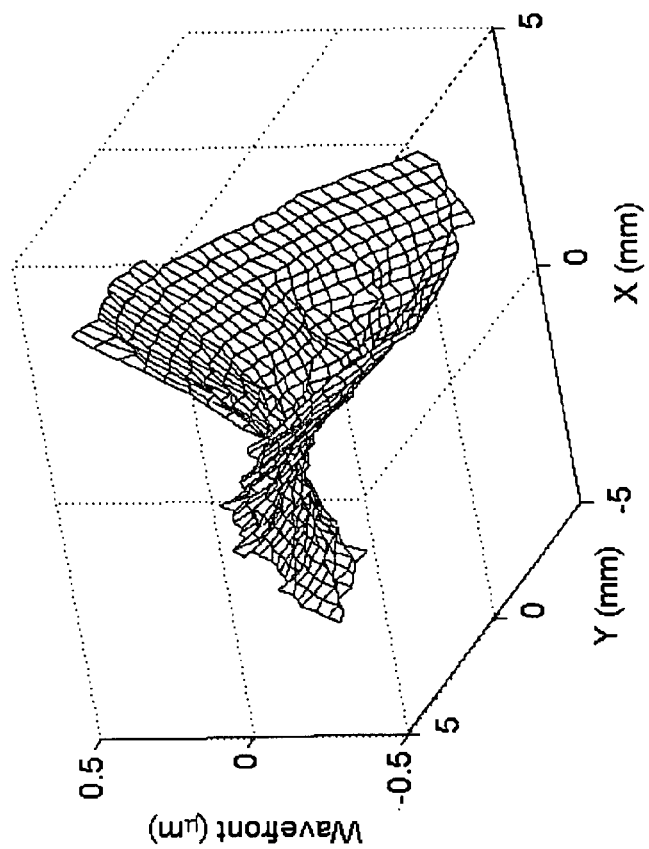
FIG. 12B shows an error plot of the measured wavefront.
Figure 12A:
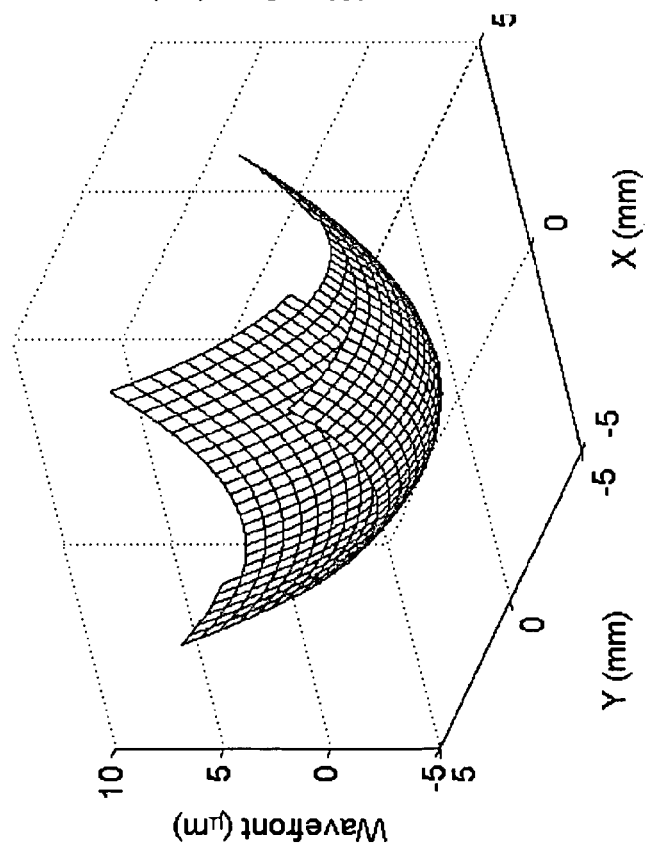
FIG. 12A shows a plot of the reflected wavefront for a 45° off-axis concave mirror measured using a Hartman sensor.

The optical performance of an off-axis concave deformable mirror was measured using the Hartman sensor. The mirror assembly comprised a 10.4 cm diameter, 3 mm thick BK7 mirror plate with a 2.2 inch clear aperture. In FIG. 12A is shown a plot of measured wavefront data for an f=77 cm focal length concave mirror at an off-axis angle of θ=45°. In FIG. 12B is shown an error plot of the same measurement depicting the difference between measured data and fit. The observed astigmatism is larger than that measured for the on-axis convex mirrors.

The results are tabulated in Table 3. The table indicates that the focal length of the deformable mirror can be varied from tens of meters down to the meter scale. However, the overall RMS surface deviation is only less than about λ/4 at λ=1054 nm. Some of this error might be due to the inherent error of the measurement setup (e.g. if the off-axis angle was not precisely 45°) or the fact that the mirror plate had a slight wedge of about 5 arcminutes. With a mirror plate of such high aspect ratio, coating stresses can be significant and might cause some of the astigmatism that is observed. To mitigate the effects of coating stress, both sides of the mirror plate can be coated.

TABLE 3

Measured focal lengths for a 3 mm thick, 10.4 cm diameter off-axis concave deformable mirror at 45° at a wavelength of 1054 nm.

| f (m) | error (m) | RMS (μm) | 80% spot (μm) | d.l. spot (μm) | 80% angle (μrad) |
|---|---|---|---|---|---|
| 64.28 | 20.36 | 0.035 | 6996 | 1637 | 54.42 |
| 29.21 | 2.51 | 0.017 | 2631 | 744 | 45.04 |
| 17.58 | 2.84 | 0.053 | 2292 | 448 | 65.16 |
| 14.64 | 2.57 | 0.082 | 2710 | 373 | 92.57 |
| 10.31 | 1.63 | 0.104 | 2262 | 263 | 109.67 |
| 7.88 | 0.97 | 0.110 | 1850 | 201 | 117.44 |
| 6.14 | 0.61 | 0.126 | 1587 | 156 | 129.33 |
| 5.04 | 0.42 | 0.127 | 1334 | 128 | 132.30 |
| 4.26 | 0.30 | 0.132 | 1163 | 108 | 136.56 |
| 3.70 | 0.22 | 0.136 | 1063 | 94 | 143.54 |
| 3.25 | 0.18 | 0.144 | 979 | 83 | 150.56 |
| 2.92 | 0.14 | 0.149 | 925 | 74 | 158.46 |

TABLE 3-continued

Measured focal lengths for a 3 mm thick, 10.4 cm diameter off-axis concave deformable mirror at 45° at a wavelength of 1054 nm.

| f (m) | RMS error (m) | 80% spot (μm) | d.l. spot (μm) | 80% angle (μrad) |
|---|---|---|---|---|
| 2.65 | 0.12 | 0.164 | 959 | 68 | 180.75 |
| 2.41 | 0.10 | 0.168 | 913 | 61 | 189.08 |
| 2.21 | 0.09 | 0.187 | 923 | 56 | 208.92 |
| 2.04 | 0.07 | 0.190 | 886 | 52 | 217.12 |
| 1.90 | 0.05 | 0.182 | 763 | 48 | 200.70 |
| 1.78 | 0.04 | 0.166 | 624 | 45 | 175.41 |

The present invention has been described as a variable focal length deformable mirror. It will be understood that the above description is merely illustrative of the applications of the principles of the present invention, the scope of which is to be determined by the claims viewed in light of the specification. Other variants and modifications of the invention will be apparent to those of skill in the art.

We claim:

1. An on-axis variable focal length deformable mirror, comprising:
   a mirror plate having a reflective surface and a symmetry axis perpendicular to the plane of the mirror plate;
   an inner circular ring, centered on the symmetry axis, that simply supports and pushes axially on a side of the mirror plate;
   an outer circular ring, concentric with and having a larger diameter than the inner circular ring, that simply supports and pushes axially on the opposite side of the mirror plate; and
   means for pushing on the inner circular ring in an axially opposed direction relative to the outer circular ring, while maintaining the planarity and parallelism of the rings, to provide a variable clamping force to the mirror plate and thereby deforming the mirror plate to provide an on-axis parabolic mirror shape.

2. The deformable mirror of claim 1, wherein the reflective surface is on the inner-ring-side of the mirror plate, thereby providing a concave deformable mirror.

3. The deformable mirror of claim 1, wherein the reflective surface is on the outer-ring-side of the mirror plate, thereby providing a convex deformable mirror.

4. The deformable mirror of claim 1, wherein the axially symmetric mirror plate comprises a round mirror plate.

5. The deformable mirror of claim 1, wherein the mirror plate comprises a glass, metal, plastic, ceramic, composite, or other deformable mechanical material.

6. The deformable mirror of claim 1, wherein the reflective surface comprises a polished or machined surface, deposited reflective coating, or dielectric multilayer coating.

7. The deformable mirror of claim 1, wherein the pushing means comprises an axial linear actuator.

8. The deformable mirror of claim 7, wherein the actuator comprises a manual or electronic adjustable screw, electromagnetic rod, fluid or gas-driven rod, or piezo crystal.

9. The deformable mirror of claim 1, wherein the variable clamping force provides a tensile stress to the mirror plate that is less than the maximum tensile stress of the mirror plate material.

10. The deformable mirror of claim 1, wherein the inner circular ring and the outer circular ring are shaped to provide a stiffness profile that remains planar under the application of the variable clamping force.

11. An off-axis variable focal length deformable mirror, comprising:
   a mirror plate having a reflective surface and a symmetry-axis about two orthogonal planes perpendicular to the plane of the mirror plate;
   an inner elliptical ring that simply supports and pushes axially on a side of the mirror plate;
   an outer elliptical ring, having a major axis that is larger than and collinear with the major axis of the inner elliptical ring, that simply supports and pushes axially on the opposite side of the mirror plate;
   wherein the inner elliptical ring and the outer elliptical ring are parallel planar sections of a single paraboloid and the symmetry axis of the mirror plate intersects and is perpendicular to the collinear major axes of the elliptical rings; and
   means for pushing on the inner elliptical ring in an axially opposed direction relative to the outer elliptical ring, while maintaining the planarity and parallelism of the rings, to provide a variable clamping force to the mirror plate and thereby deforming the mirror plate to provide an off-axis parabolic mirror shape.

12. The deformable mirror of claim 11, wherein the reflective surface is on the inner-ring-side of the mirror plate, thereby providing a concave deformable mirror.

13. The deformable mirror of claim 11, wherein the reflective surface is on the outer-ring-side of the mirror plate, thereby providing a convex deformable mirror.

14. The deformable mirror of claim 11, wherein the mirror plate comprises a glass, metal, plastic, ceramic, composite, or other deformable mechanical material.

15. The deformable mirror of claim 11, wherein the reflective surface comprises a polished or machined surface, deposited reflective coating, or dielectric multilayer coating.

16. The deformable mirror of claim 11, wherein the pushing means comprises an axial linear actuator.

17. The deformable mirror of claim 16, wherein the actuator comprises a manual or electronic micrometer screw, electromagnetic rod, fluid or gas-driven rod, or piezo crystal.

18. The deformable mirror of claim 11, wherein the variable clamping force provides a tensile stress to the mirror plate that is less than the maximum tensile stress of the mirror plate material.

19. The deformable mirror of claim 11, wherein the outer elliptical ring is centered on the symmetry axis of the mirror plate.

20. The deformable mirror of claim 11, wherein the inner elliptical ring and the outer elliptical ring are shaped to provide a stiffness profile that remains planar under the application of the variable clamping force.

* * * * *